United States Patent
Anzai

(10) Patent No.: US 6,323,933 B1
(45) Date of Patent: Nov. 27, 2001

(54) IMAGE READING DEVICE AND METHOD

(75) Inventor: Toshiaki Anzai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/488,016

(22) Filed: Jan. 20, 2000

(30) Foreign Application Priority Data

Jun. 28, 1999 (JP) .................................................. 11-182580

(51) Int. Cl.[7] .......................... G03B 27/32; G03B 27/52; H04N 1/40
(52) U.S. Cl. ................................. 355/23; 355/40; 358/447
(58) Field of Search ........................... 355/27–29, 40–41, 355/23–26; 358/448, 497, 447

(56) References Cited

U.S. PATENT DOCUMENTS

| | | | |
|---|---|---|---|
| 5,146,351 | * | 9/1992 | Maehara ................................. 358/448 |
| 5,745,253 | * | 4/1998 | Muramatsu et al. ................. 358/408 |
| 6,088,138 | * | 6/2000 | Sakai et al. ........................... 358/540 |
| 6,122,077 | * | 9/2000 | Kaji ....................................... 358/448 |

OTHER PUBLICATIONS

Patent Abstract of Japan No. 5–14717, dated Jan. 22, 1993.
Patent Abstract of Japan No. 7–32711, dated Feb. 3, 1995.
Patent Abstract of Japan No. 7–193680, dated Jul. 28, 1995.
Patent Abstract of Japan No. 9–233321, dated Sep. 5, 1997.

* cited by examiner

*Primary Examiner*—Russell Adams
*Assistant Examiner*—Hung Henry Nguyen
(74) *Attorney, Agent, or Firm*—Armstrong, Westerman, Hattori, McLeland & Naughton, LLP

(57) ABSTRACT

It is an exemplified object of the present invention is to provide an image reading device and method that would realize a high-resolution image reading. The present invention connects to a movable optical system in a double-sided image readable device at least one of black and white references that a fixed side should referred to.

10 Claims, 4 Drawing Sheets

IMAGE READING DEVICE AND METHOD

BACKGROUND OF THE INVENTION

The present invention relates generally to image reading (or readable) devices and methods, and more particularly to a double-sided image readable device and method. A double-sided image readable device means a device that serves to read front and rear surfaces of a document simultaneously. The present invention is suitable for double-sided readable image scanners, copiers, facsimile machines, electrophotographic devices having flat bed unit and automatic document feed ("ADF") unit (or a sheet feed unit). A flat bed unit means a type that uses an optical system to read a document statically placed on a glass board, while an ADF unit means a type that automatically and mechanically feeds a document paper so as to read it using a static optical system.

As recent demands for effective use of resource have increased opportunities to use documents having images on its both sides, high-speed and high-resolution double-sided readable image scanners that may read the images on both document sides have been sought. An image scanner converts data indicative of lightness and density for each pixel color that has been obtained by scanning, into digital data as a result of comparison with white and black reference data. A double-sided readable image scanner typically includes flat bed and ADF units, a first optical system at the flat bed unit side, a second optical system at the ADF unit side, first and second white reference boards, and first black reference board. These white and black reference boards are fixed onto a housing. The first optical system reads one document surface, whereas the second optical system reads the other surface of the document. Each optical system includes a fluorescent lamp and CCD sensor, and reads the document by emitting lamplight onto the document and converting the reflection light into an electronic signal using the CCD sensor. The first white and black reference boards are arranged apart from a document feed path, and used as white and black references, respectively, for the first optical system. The second white reference board is located below the document feed path and used as white and black references for the second optical system.

In general, an image scanner corrects white and black reference data at the beginning of reading and at an appropriate intermission during a reading of a large amount of pages (for instance, every 50-page reading) in order to correct a change in quantity of lamp's light and the sensitivity dispersion of photosensitive pixels in the CCD sensor. According to the conventional correction method of white and black reference data, the first optical system, which is movable, moves to the first white and black reference boards and reads them while the lamp turns on. The second optical system, which is not movable, reads the second white reference board just below the feed path while the lamp turns on and sets the resultant value as a white reference. In addition, the second optical system reads the second white reference board while the lamp turns off and sets the resultant value as a black reference.

White and black reference values are generated as one line pixel data from the read white and black reference data, and stored in a memory. In reading the document, these white and black reference values are used for correction of image data (which is referred to as "shading correction").

However, external leakage light that reaches the second white reference board even when the fluorescent lamp turns off would cause the second white reference board to be incomplete or whitish black. Light black set as a black reference, or recognition of white as black would cause a read image to be more blackish than an actual image, disadvantageously preventing a high-resolution image reading.

BRIEF SUMMARY OF THE INVENTION

Therefore, it is an exemplified general object of the present invention to provide a novel and useful image reading device and method in which the above disadvantages are eliminated.

Another exemplified and more specific object of the present invention is to provide an image reading device and method that would realize a high-resolution image reading.

In order to achieve the above objects, an image reading device of one aspect according to the present invention comprises a first optical system which reads one surface of a document, a drive part which moves the first optical system, a second optical system which reads the other surface of a document, first white reference part and first black reference part readable by the first optical system moved by the first drive part, second white reference part and second black reference part readable by the second optical system, at least one of the second white and black reference parts being arranged to be movable, and a control part which controls the first optical system, drive part, and second optical system. This image reading device movably arranges at least one of the second white and black reference parts, and enables the second optical system to read the one reference part. Therefore, the second optical system may read both of the second white and black reference parts even when the other of the second white and black reference parts is fixed.

An image reading method of another aspect of the present invention comprises a first step of reading one surface of a document using a first optical system and the other surface of the document using a second optical system, a second step of moving the first optical system and first white reference part relative to each other, and reading the first white reference part using the first optical system, a third step of moving the first optical system and first black reference part relative to each other, and reading the first black reference part using the first optical system, a fourth step of moving one of second white reference part and second black reference part relative to each other, and reading the one of the second white and black reference parts using the second optical system, and a fifth step of reading the other of the second white and black reference parts using the second optical system. Such a reading method may realize the above operation.

Other objects and further features of the present invention will become readily apparent from the following description of the embodiments with reference to accompanying drawings.

DETAILED DESCRIPTION OF INVENTION

Figure 1:
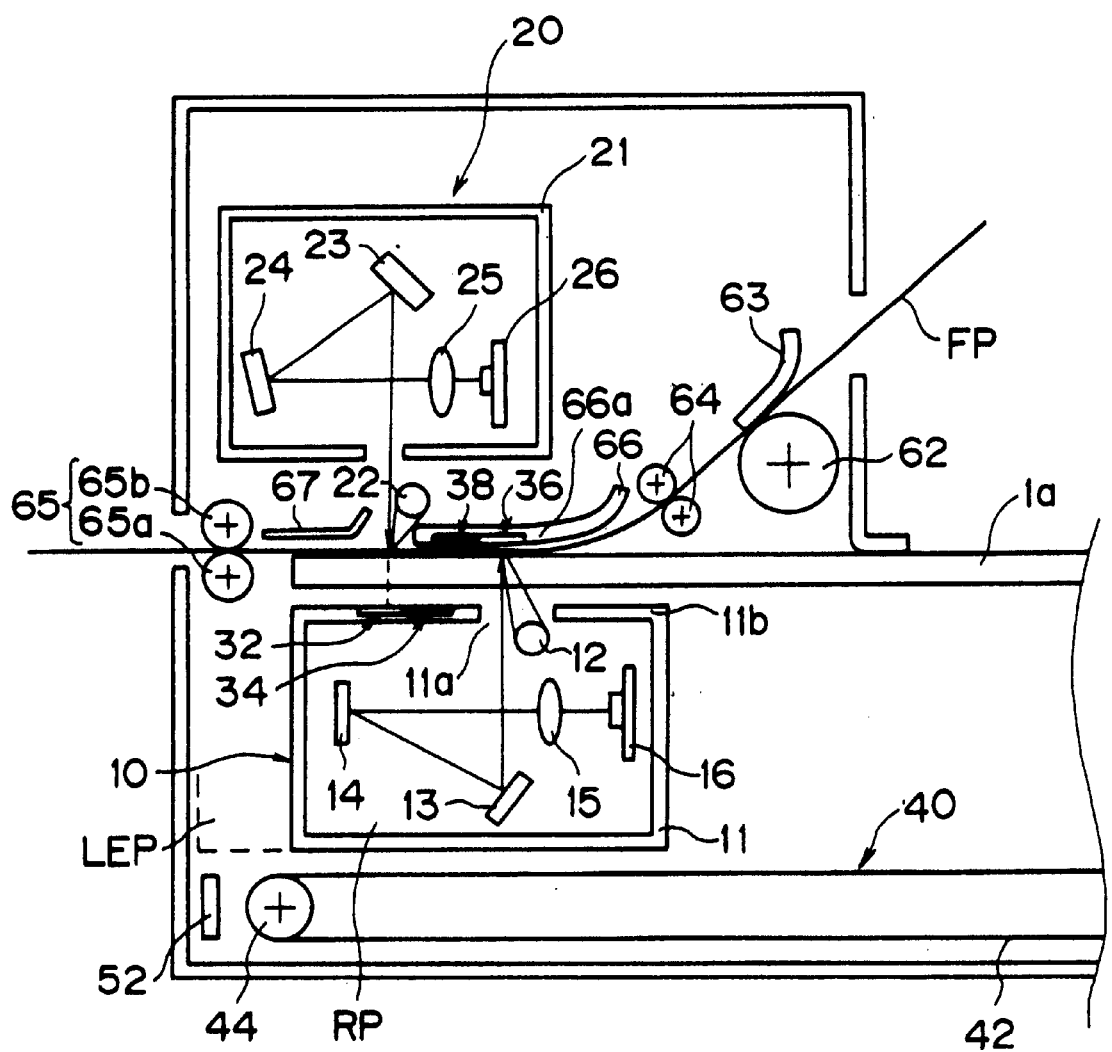
FIG. 1 is a partially enlarged schematic section of a double-sided image scanner of one aspect the present invention.
Figure 2:
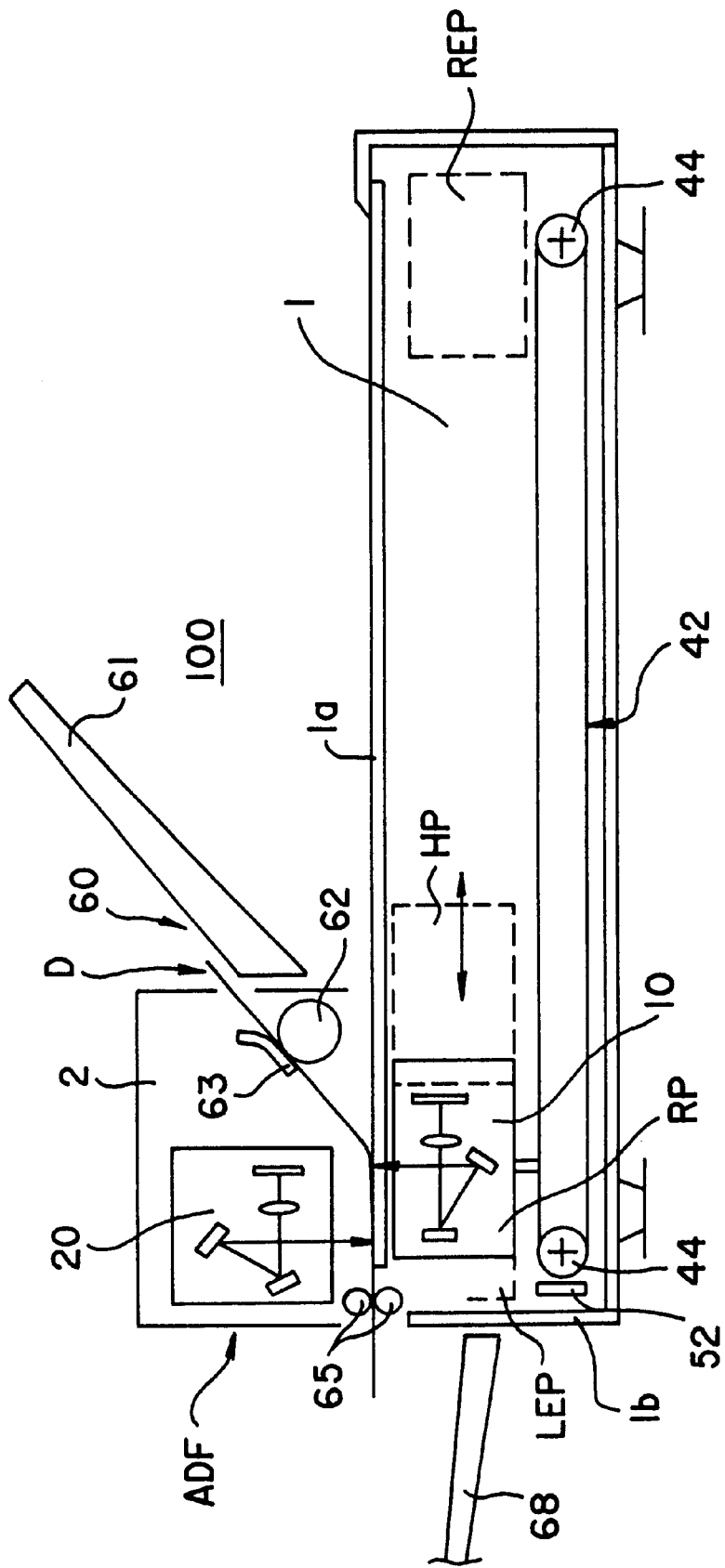
FIG. 2 is a schematic sectional overview of the double-sided image scanner shown in FIG. 1.
Figure 3:
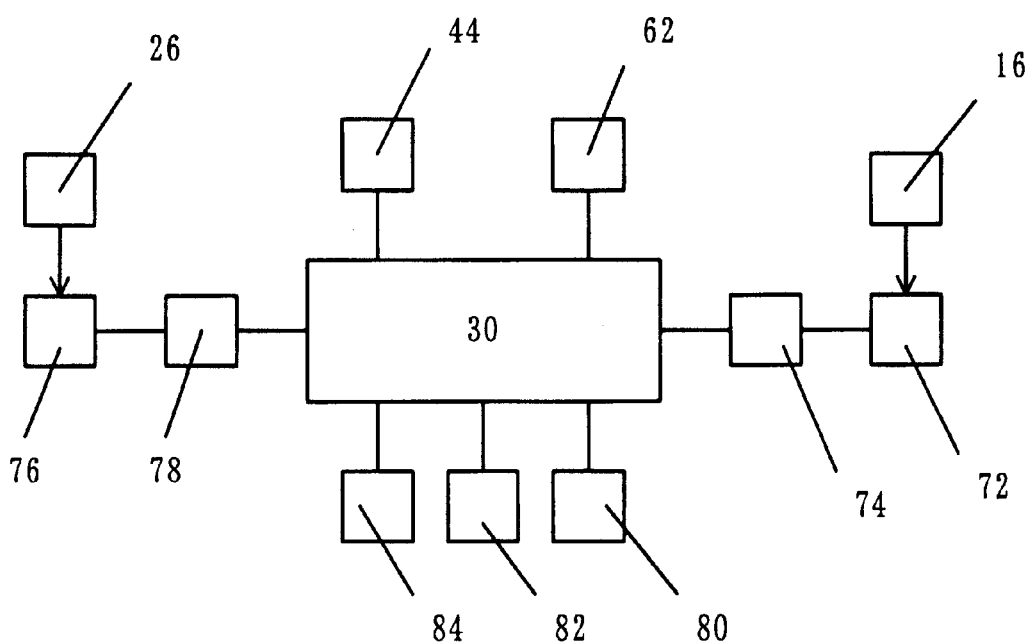
FIG. 3 is a schematic block diagram of a control system in the image scanner shown in FIG. 1.

A description will now be given of double-sided readable image scanner (hereafter "image scanner") 100 of one embodiment according to the present invention, with reference to FIGS. 1 through 3. FIG. 1 is a partially enlarged schematic section of the double-sided image scanner 100 of the present invention. FIG. 2 is a schematic sectional overview of the double-sided image scanner shown in FIG. 1. FIG. 3 is a block diagram of the image scanner 100 shown in FIG. 1. As shown in FIG. 1, the image scanner 100 includes lower housing 1 that constitutes a flat bed unit, and upper housing 2 that constitutes an ADF unit. Needless to say, the lower housing 1 is not limited the flat bed unit, and the upper housing 2 is not limited to the ADF unit.

Exemplarily, the lower housing 1 is approximately cuboid and has document glass table 1a at the top thereof. Transparent glass is attached to the document glass table 1a. The lower housing 1 includes first optical system 10, white reference part 32, black reference part 34, and drive system 40 which moves first optical system 10 in a vertical scanning direction, optical sensor 52, one roller 65a of feed rollers 65, and eject tray 68 which stores ejected document D at front end 1b. The eject tray 68 is typically attached detachably to the front end 1b of the lower housing 1.

The first optical system 10 includes in housing 11, lamp (light-emitting element) 12, mirror 13 and 14, lens 15, and photoelectric converter (light-receiving element) 16. The illustrated kind, arrangement, number of these elements are merely example, and various modifications may be made as far as the photoelectric converter 16 receives reflection light from the lamp 12 through a document surface. For example, any position and number of mirrors may be freely selected according to the necessary light path. A filter having a predetermined transmissivity (or a plurality of filters having different transmissivities) may be provided on the light path. The lamp 12 includes, for example, a halogen or fluorescent lamp, and serves as a light source what emits light onto document D via the slit 11a in the housing 11 and the document glass table 1a. A reflector (not shown) that partially focuses light from the lamp 12 on the document D is provided around the lamp 12. The mirrors 13 and 14 serve to reflect reflection light that is light emitted from the lamp 12 onto a document surface. The lens 15 focuses light reflected by mirror 14 onto a light-receiving surface on the photoelectric converter 16. The photoelectric converter 16 is made of a CCD sensor which includes a photosensitive element having 600 pixels per inch, and may output as an analog signal a pixel for one line from the document D or the white and black reference parts 36 and 38 which will be described later. As the photoelectric converter 16 may handle binary and multi-gradation images, the image scanner 100 may be used as monochromatic, multi-gradation, and multi-color scanners.

The white and black reference parts 32 and 34 are provided at the top 11b of the housing 11 in the first optical system 10. The white and black reference parts 32 and 34 are respectively made, for example, of white and black plastic labels. The illustrated number, size, position and the like of white and black reference parts 32 and 34 are a mere example. Although the instant embodiment arranges the white reference part 32 at the left side of the black reference part 34 as shown in FIG. 1, it may arrange the white reference part 32 at the right side of the black reference part 34. The second optical system 20 refers to the white and black reference parts 32 and 34 when correcting a change in the light amount of the lamp 22 and the sensitivity dispersion of the photoelectric converter 26.

The white and black reference parts 32 and 34 are moved with the first optical system 10 by the drive system 40 as described later, but they may be moved independent of the first optical system 10 or driven by another drive source different from the drive system 40. A moving direction of each of the white and black reference parts 32 and 34 is not limited to the vertical scanning direction as described later. The instant embodiment includes the black reference part 34 that has not been provided in conventional double-sided readable scanners.

The drive system 40 includes drive belt 42, and pulley 44 that drives the drive belt 42. The lower housing 1 is connected to the eject tray 68. The drive system 40 reciprocates the first optical system 10 in the vertical scanning direction of the document D (i.e., an arrow direction in FIG. 2). The drive belt 42 is connected to the first optical system 10, and rotatably driven by the pulley 44. The drive system 40 moves the first optical system 10 between right edge position ("REP") and left edge position ("LEP") as indicated by broken lines in FIG. 2. Read position ("RP") and home position ("HP") which is an initial position for the flat bed reading are placed between the REP and LEP. The real lines in FIGS. 1 and 2 indicate that the first optical system 10 is located at the RP.

The HP is a position to which the first optical system returns automatically during a predetermined flat bed reading operation of the image scanner 100, and the HP is also used as a reference position for various operations. When the first optical system 10 is located at the HP, the control part 30 controls the motor 44 so that the first optical system 10 moves from this position by a predetermined clock. The RP is a read position for the first and second optical systems 10 and 20 to read the document D, and is also used for them to read the white reference parts 32 and 36 in the instant embodiment. When the white and black reference parts 32 and 34 are arranged conversely, it would be understood that the first and second optical systems 10 and 20 do not necessary read the white reference parts 32 and 36 at the RP. The LEP is a reference position to which the first optical system 10 is initially moved in an initial operation after the image scanner 100 turns on. The LEP is also used for subsequent various operations. When the first optical system 10 is located at the LEP, the control part 30 may control the motor 44 so that the first optical system 10 moves from this position by a predetermined clock.

Those skilled in the art would easily conceive the way of detecting a position of the first optical system 10 in view of the disclosure of the instant application, for example, using a reflection-type photo-interrupter, such as optical sensor 52 which will be described later, and a detailed description thereof will be omitted. The optical sensor 52 includes a light-receiving element, such as a pin photodiode, and may receive light from a light-emitting element (not shown) fixed onto the lower housing 1. The optical sensor 52 is so arranged that it cannot receive light from the light-emitting element when the first optical system 10 is located at the LEP.

The upper housing 2 includes the second optical system 20 and feed system 60. The second optical system 20 includes in housing 21, lamp (light-emitting element) 22, mirrors 23 and 24, lens 25, and photoelectric converter (light-receiving element) 26. These elements correspond to lamp (light-emitting element) 12, mirrors 13 and 14, lens 15, and photoelectric converter (light-receiving element) 16, and a description thereof will be omitted. The second optical system 20 is fixed onto the upper housing 2 and thus it is not movable.

The feed system 60 defines the feed path FP, and includes paper-supply tray 61, separation roller 62, separation gate 63, feed rollers 64 and 65 (65b), top plates 66 and 67. The paper-supply tray 61 supplies documents D one by one to the upper housing 2. The separation roller 62 introduces the lowest document D to the feed path FP by compressing a plurality of documents D mounted on the paper-supply tray 61 against the rubber separation gate 63. The separation roller 62 rotates counterclockwise in FIGS. 1 and 2. The feed rollers 64 and 65 are driven by the same drive source as that of the separation roller 62 or a different drive source from that of the separation roller 62, and move the document D along the feed path FP. The top plates 66 and 67 compress the document D from the top so as to prevent jamming caused by the crumpled or slacked document D. The ejected document D is mounted onto the eject tray 68 attached at the front end 1b of the lower housing 1.

Referring to FIG. 1, the white and black reference parts 36 and 38 are attached to the bottom 66a of the top plate 66. The white and black reference part 36 and 38 are made of white and black plastic labels, similar to the white and black reference parts 32 and 34. The illustrated number, size, position of the white and black reference parts 36 and 38 are mere examples. As shown in FIG. 1, the instant embodiment arranges the white reference part 36 at the right side of the black reference part 38, but may arrange the white reference part 36 at the left side of the black reference part 38. The optical system 10 refers to the white and black reference parts 36 and 38 when correcting the light amount of the lamp 12 and the sensitivity dispersion of the photoelectric converter 16.

In this way, the white and black reference parts 36 and 38 are fixed onto the upper housing 2, but may be arranged to be movable relative to each other in the upper housing 2. Although the white and black reference parts 36 and 38 have been fixed even in the conventional image scanners, they have typically been fixed in place so that the first optical system 10 near the HP in the lower housing 1 may read them. In contrast, the present embodiment arranges the white reference part 36 so that the optical system 10 at the RP may read it, and arranges the black reference part 38 so that the optical system 10 at the HP may read it.

The instant embodiment arranges the white and black reference parts 32, 34, 36, and 38 so that when the first optical system 10 reads the white reference part 36, the second optical system 20 reads the white reference part 32, and when the first optical system 10 reads the black reference part 38, the second optical system 20 reads the white reference part 34.

FIG. 3 is a schematic block diagram of a control system in the image scanner 100. As shown in FIG. 3, the control part 30 is connected to motors 44 and 62, A/D converters 72 and 76, shading correction circuits 74 and 78, line memory 80, ROM 82, and RAM 84. Those elements which are connected to the control part 30 are not limited to the above components, and FIG. 3 only illustrates a portion relevant to the instant embodiment. The A/D converter 72 and 76 optionally include an amplifier (not shown) at its previous stage, and the photoelectric converters 16 and 26 each convert an analog signal to a digital signal. The shading correction circuits 74 and 78 each perform a shading correction with respect to a digital signal. The line memory 80 includes a white line memory part that stores a white reference value (white reference data) and a black line memory part that stores a black reference value (black reference data).

Figure 4:
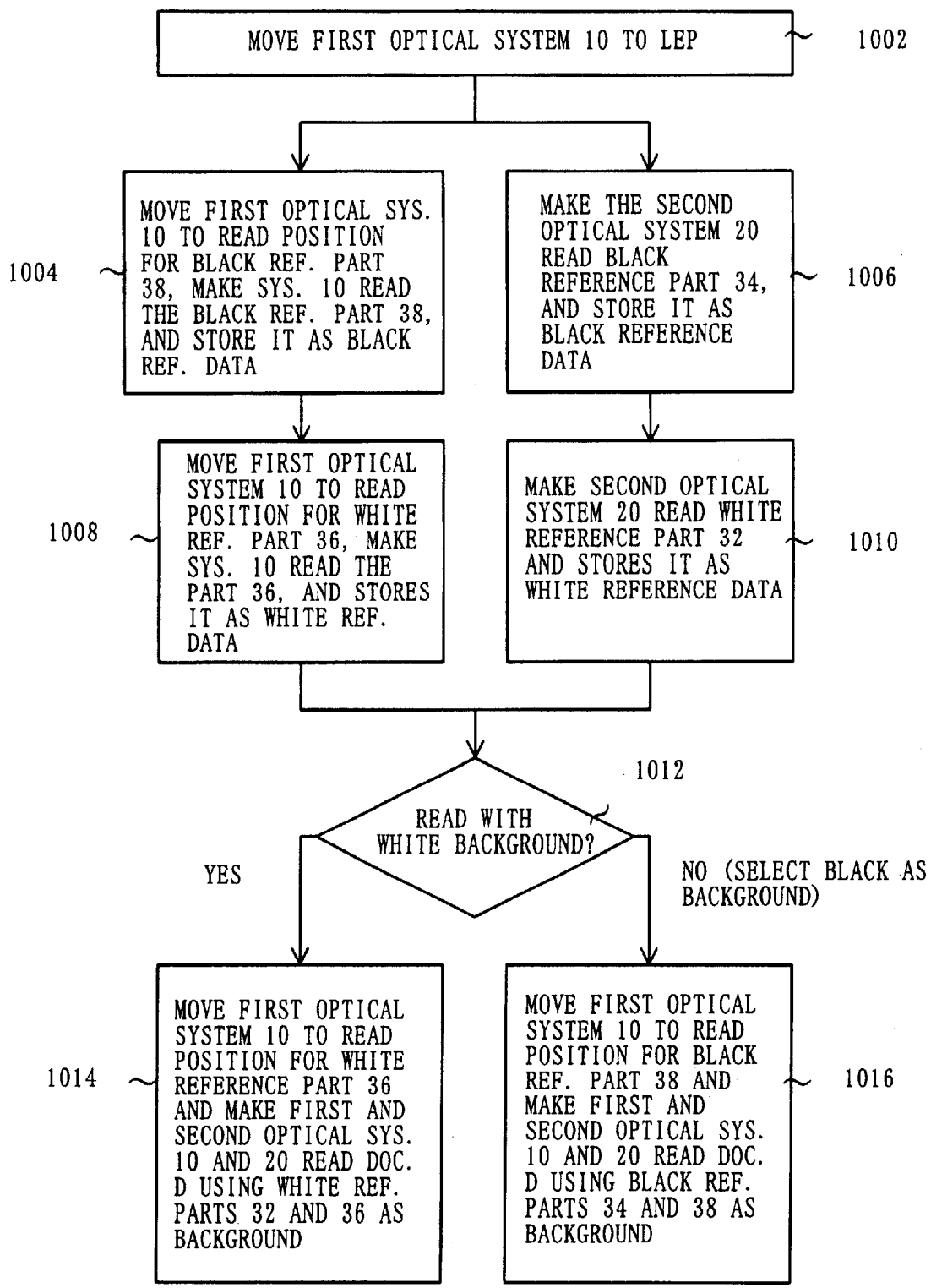
FIG. 4 is a flowchart for explaining an exemplified operation of the control part shown in FIG. 3.

With reference to FIG. 4, a description will be given of an operation of the image scanner 100. FIG. 4 is a flowchart of an image scanning operation of the image scanner 100.

When the image scanner 100 is powered on, the control part 30 drives the motor 44 so that the first optical system 10 moves to the LEP (step 1002). The sensor 52 thereby detects the first optical system 10, and enables a positional control over the first optical system 10. The first and second optical systems 10 and 20 then read the white and black reference parts 32 through 38: The first and second optical systems 10 and 20 should read the white and black reference parts 32 through 38 at the beginning of ADF reading and whenever they continuously read predetermined pages (for example, 50 pages) of documents D, in order to correct changes in the light amount of the lamps 12 and 22 and the sensitivity dispersions of the photosensitive pixels in the CCD sensors 16 and 26. In this case, the first optical system 10 is located at the HP, and the step 1002 is omitted and need not be repeated.

Next, the control part 30 drives the motor 44 so as to move the first optical system 10 to a read position of the black reference part 38 and make the first optical system 10 read the black reference part 38. The control part 30 stores resultant black reference data in the line memory 80 (step 1004). The first optical system 10 is moved to the right by a predetermined clock from the LEP using the feed belt 42 and motor 44. The instant embodiment simultaneously makes the second optical system 20 read the black reference part 34 and stores the resultant black reference data in the line memory 80 (step 1006).

In steps 1004 and 1006, the first and second optical systems 10 and 20 turn on, but more preferably turn off, lamps 12 and 22, read a plurality of lines of black reference parts 34 and 38, add them to each other for each bit unit, calculate an average for each line from the addition result, and store the average in the line memory 80. Then, the first optical system 10 may return to the HP or stay at a position after reading the black reference part, although the first optical system 10 returns to the HP in the instant embodiment. Thus, the second optical system 20 in the instant embodiment reads the complete black-color reference part 34, not a white reference part under a turn-off condition, improving the reading reliance and providing a high quality image reading in comparison with the conventional way. A reading of black reference part 34 under a turn-off condition would use a more blackish image for a black reference and improve the reference data quality.

The control part 30 then drives the motor 44, and moves the first optical system 10 to a read position for the white reference part 36, makes it read the white reference part 36, and stores the resultant white reference data in the line memory 80 (step 1008). The first optical system 10 is moved to the left by a predetermined clock from the HP by the feed belt 42 and motor 44. This embodiment simultaneously makes the second optical system 20 read the white reference part 32, and stores it as white reference data in the line memory 80 (step 1010). In the steps 1008 and 1010, the first and second optical systems 10 and 20 turn on the lamps 12 and 22, read the white reference parts 32 and 36 for a plurality of lines, add them to each other for each bit unit, calculate an average for each line from the addition result, and store the average in the line memory 80. The steps 1008 and 1010 may be conducted prior to the steps 1004 and 1006. Optionally, prior to the average operation, the control part 30 may calculate a difference between every line value and a reference value, and display a sign that prompts a user to remove a possible dust or dewfall on the white reference part 32 and/or 34 when judging that the difference exceeds a permissible value.

The control part 30 then judges whether a user of the image scanner 100 has selected an image reading with a white-color background (step 1012). The control part 30 moves the first optical system 10 to a read position for the white reference part 36 from the HP when judging that a user has selected the white-color background, and makes the first and second optical systems 10 and 20 read the document D using the white reference parts 32 and 36 as a background (step 1014). The white reference parts 32 and 36 are more whitish than a universal regular paper. In the reading operation, the photoelectric converters 16 and 26 integrally compare image data of the read document D with the line memory 80 for each line, and generates a trigger signal which indicates that the photoelectric converters 16 and 26 detect the edge of the document D when an output of image data is smaller than the data recorded in the line memory 80 and the document edge passes the read position. The control part 30 determines the read start time in response to the trigger signal.

In contrast, when the control part 30 judges that the user has selected an image reading with a black-color background (step 1012), it moves the first optical system 10 to the read position for the black reference part 38 from the HP, and makes the first and second optical parts 10 and 20 read the document D using the black reference parts 34 and 38 as a background (step 1016).

The steps 1014 and 1016 perform a shading correction. Generally, the corrected image data G' is calculated using image data G prior to the correction, constant k, black reference value B, white reference value W as follows:

$$G'=k\times\{(G-B)/(W-B)\}$$

This equation may be calculated by hardware such as a divider and a subtracter, or by software. As a result, changes in the light amount of the lamps 12 and 22 and sensitivity dispersions of photosensitive pixels in the CCD sensors 16 and 26 may be properly corrected.

Further, the present invention is not limited to these preferred embodiments, but various variations and modifications may be made without departing from the scope of the present invention. For example, the white and black reference parts 32 and 34 are both movable in the instant embodiment, but only one of them is made movable. For example, as seen in the conventional art, the white reference part 32 is fixed onto the lower housing 1 and the black reference part 34 is made movable so that the black reference part 34 interrupts a path between the second optical system 20 and the white reference part 32. Conversely, the black reference part 34 is fixed onto the lower housing 1, and the white reference part 32 is made movable so that the white reference part 32 interrupts a path between the second optical system 20 and the black reference part 34. The white and black reference parts 32 and 34 are bonded together and made rotatable relative to the second optical system 20.

According to the image reading device and method of one aspect of the present invention, the second optical system may read both of the second white and black reference parts, thus providing a higher quality image reading than the conventional image reading device that uses one white reference for both white and black references.

What is claimed is:

1. An image reading device comprising:

a first optical system which reads one surface of a document;

a drive part which moves said first optical system;

a second optical system which reads the other surface of a document;

a first white reference part and a first black reference part readable by said first optical system moved by said drive part;

a second white reference part and a second black reference part readable by said second optical system, at least one of said second white and second black reference parts being arranged to be movable to a position at which said second optical system reads the moveable reference part; and a control part which controls said first optical system, drive part, and second optical system.

2. An image reading device according to claim 1, wherein one of said second white and black reference parts is connected to said drive part and arranged to be movable by said drive part.

3. An image reading device according to claim 1, wherein one of said second white and black reference parts is connected to said first optical system and arranged to be movable together with said first optical system.

4. An image reading device according to claim 1, wherein one of said second white and black reference parts is located at a read position for use with said second optical system to read the document.

5. An image reading device according to claim 1, wherein said first and second white reference parts are arranged so that said second optical system reads said second white reference part while said first optical system is reading said first white reference part, and wherein said first and second black reference parts are arranged so that said second optical system reads said second black reference part while said first optical system is reading said first black reference part.

6. An image reading device according to claim 1, wherein said second optical system includes a lamp, and said control part controls said second optical system so that the lamp turns off when said second optical system reads said second black reference part.

7. An image reading method comprising:

a first step of reading one surface of a document using a first optical system and the other surface of the document using a second optical system;

a second step of moving the first optical system and first white reference part relative to each other, and reading the first white reference part using the first optical system;

a third step of moving the first optical system and first black reference part relative to each other, and reading the first black reference part using the first optical system;

a fourth step of moving one of second white reference part and second black reference part relative to each other, and reading said one of the second white and black reference parts using the second optical system; and a fifth step of reading the other of the second white and black reference parts using the second optical system.

8. A method according to claim 7, wherein said fifth step moves the second optical system and said other of the second white and black reference parts relative to each other.

9. A method according to claim 7, wherein said other is the second white reference part, and said second and fourth steps are conducted simultaneously.

10. A method according to claim 7, wherein said other is the second white reference part, and said third and fifth steps are conducted simultaneously.

* * * * *